Aug. 2, 1927. 1,637,482
H. S. GRAVES
METHOD AND APPARATUS FOR TESTING PISTON RINGS
Filed Oct. 8, 1925
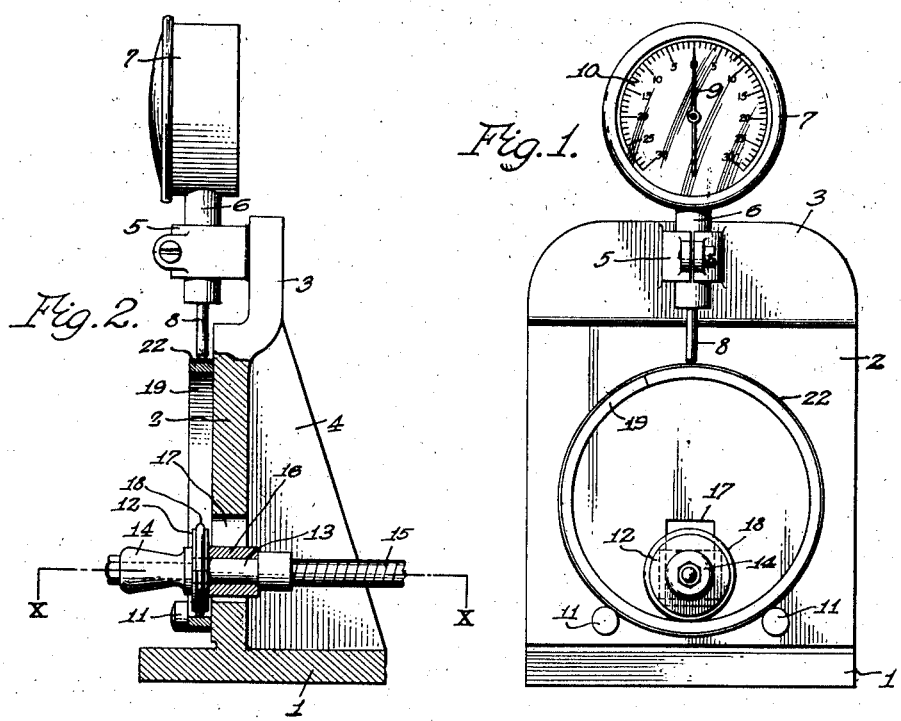
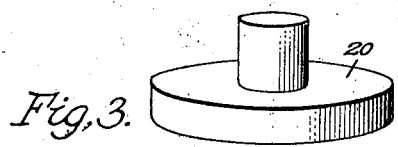
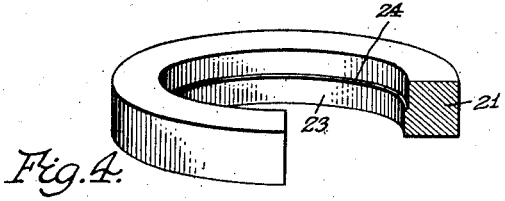
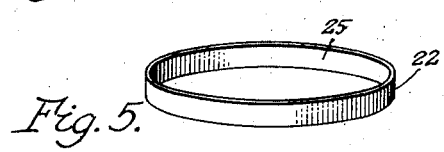
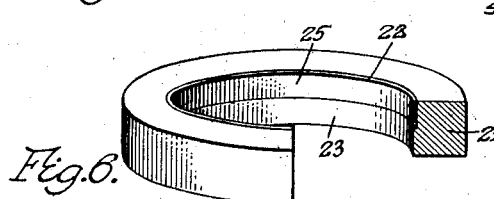
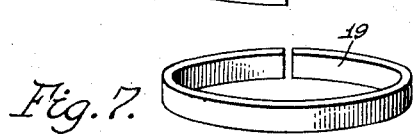
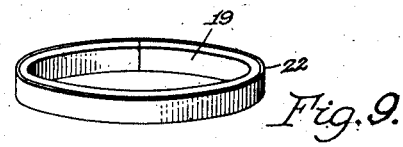
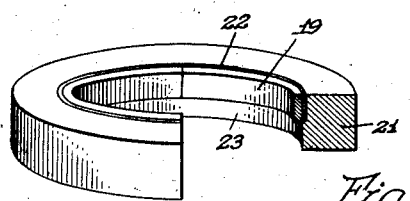
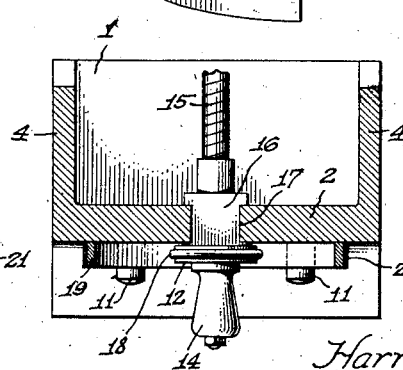
Inventor
Harry S. Graves,
By
Attorneys Patented Aug. 2, 1927.

1,637,482

UNITED STATES PATENT OFFICE.

HARRY S. GRAVES, OF DETROIT, MICHIGAN, ASSIGNOR TO SPIRAL PISTON RING COMPANY, OF DETROIT, MICHIGAN, A CORPORATION OF MICHIGAN.

METHOD AND APPARATUS FOR TESTING PISTON RINGS.

Application filed October 8, 1925. Serial No. 61,210.

This invention relates to a method and apparatus for testing piston rings, and my invention aims to provide an apparatus in which a ring or other annular member may be placed and operated relative to an indicator or feeler to determine irregularities in the circular contour of the ring or member, particularly the degree of imperfection or out-of-roundness.

In the manufacture of piston rings for internal combustion engines, it is essential that the rings used in connection with engine pistons be perfect or as near so as possible, in order to insure a non-leakable packing between a piston and cylinder wall and thus assure a high degree of compression in the cylinders of an internal combustion engine. The majority of piston rings now used are made under quantity production and the majority of these rings are from ten to twenty thousandths of an inch out of round, consequently the use of such rings does not contribute to the full efficiency of an internal combustion engine. Some of these rings are tested by sight and various kinds of instruments, but with no actual precision such as may be attained by my apparatus, which will show the thousandths part of an imperfection should it occur in place on the periphery of a piston ring.

My apparatus has been designed for expeditiously testing split piston rings and a method is involved that insures a test of a ring for a cylinder wall against which it is adapted to operate in an engine. The method involves producing a split ring which, under quantity production, will accurately fit in an engine cylinder; second, fitting a resilient band about the ring to hold it under such compression as it will have in the engine cylinder, and then revolving the ring and its band so that the periphery of the band may be examined by an indicator or feeling instrumentality to learn of any imperfection in the circular contour of the ring. If the piston ring is out of round it will bulge or distort the resilient band accordingly and by measuring the band the irregularities in the piston ring enclosed thereby may be ascertained. Since the split piston ring is necessarily placed under compression by cylinder walls, it is essential that the ring be tested under a compressed condition and for this purpose a thin resilient band is used having an inner wall corresponding to the cylinder wall in which the ring is adapted to operate.

To facilitate mounting the piston ring in the band a holder is employed for the band and the holder is constructed true to form so that the inner wall of the band will positively represent the inner wall of the cylinder and when mounted on the piston ring permit of the outer wall of the ring being tested to ascertain how close it conforms to a cylinder wall.

My invention will be hereinafter described by aid of the drawing, wherein

Figure 1 is a side elevation of the testing apparatus, partly in vertical section;

Fig. 2 is a front elevation of the testing apparatus;

Fig. 3 is a perspective view of a cylinder plug or master die;

Fig. 4 is a perspective view of a band roller, partly broken away and partly in section;

Fig. 5 is a similar view of a thin resilient band;

Fig. 6 is a view similar to Fig. 4 with the band mounted in the holder;

Fig. 7 is a perspective view of a split piston ring adapted to be tested;

Fig. 8 is a view similar to Fig. 6 showing the piston ring mounted in the band within the holder;

Fig. 9 is a perspective view of the ring and band removed and ready for testing, and Fig. 10 is a horizontal sectional view taken on the line X—X of Fig. 2.

The testing apparatus comprises a base 1 having a vertical wall 2 provided with an offset upper edge 3 braced relative to the base 1 by side webs 4. Projecting outwardly from the offset edge 3 of the wall 2 is a bracket or clamp 5 for the stem 6 of an indicator or testing gauge 7, which is of a conventional form including a plunger 8 that may be actuated to cause movement of an indicator hand 9 relative to a graduated dial 10. The dial is graduated for thousandths of an inch under or over zero, which for the purposes of this invention may be considered as perfection.

The lower part of the wall 2 is provided with anti-friction rollers or studs 11 and these rollers or studs are spaced apart in a horizontal plane so as to constitute a support.

Adjacent the anti-frictional rollers or supports 11 is a driven wheel or roller 12 mounted on a spindle 13 that may be driven by hand or from a suitable source of power. The spindle has been shown as provided with a handle 14 and with a driven flexible shaft 15. The spindle 13 is journaled in the bearing 16 slidable in a slot 17 of the wall 2 and by virtue of the handle 14 the bearing and its spindle may be raised. As shown the bearing 16 assumes a natural low position in the slot 17 by gravity.

The periphery of the roller or wheel 12 may be provided with an annular friction ring or tread 18 so that the roller or wheel 12 may be used for driving a piston ring or annular member placed on the anti-friction rollers 11 against the wall 2 and under the indicator plunger 8.

The reference numeral 19 denotes a split piston ring, which under quantity production is made as near perfect as possible, but because of quantity production running into large figures there may be a few rings in each thousand that will be either undersize or oversize, and I aim to test these rings, from time to time, to ascertain how near the quantity production is to being perfect. To do this I use devices simulating an engine cylinder. First, there is a cylinder plug or master die 20 true to form and adapted when properly lubricated to perfectly fit in a cylinder bore and represent a piston therein. This plug is used, from time to time to test a holder 21 and a resilient band 22. The holder 21 is an annular member having a wall 23 true to form and representing a cylinder bore. If this wall 23 is perfect the cylinder plug or master die 20 will properly fit therein. The annular wall 23 is cut away to provide an annular shoulder or seat 24 for the ring 22 and this ring is made of thin resilient material so that it may be readily flexed. It is made as perfect as possible and when placed in the holder 21 the inner wall 25 of the band is adapted to accurately contact with the inner wall 23 of the holder 21, so that the cylinder plug or master die 20 can be shifted through the holder 21 just as though the walls 23 and 25 were integral or a cylinder wall.

The split ring 19 is now placed under compression or contracted by the fingers and said ring placed in the holder 21 until it is within the resilient band 22, said band holding the split piston ring in its compressed condition.

The band and ring can now be bodily removed from the holder 21, as shown in Fig. 9, and placed on the supporting rollers 11 of the testing apparatus with the driven roller or wheel 12 engaging the inner wall of the piston ring. The outer wall of the band 22 is adapted to be engaged by the indicator plunger 8 and it is by virtue of the bracket or clamp 5 that the indicator 7 may be set for testing piston rings approaching a predetermined size.

With the band inclosed piston ring sandwiched or mounted between the rollers 11 and the wheel 12, said wheel may be rotated by hand or power whereby its frictional contact with the inner wall of the piston ring 19 will cause the piston ring to revolve. In so doing the outer wall of the band 22 passes under the indicator plunger 8 and since this resilient band is under the expansive influence of the contracted or compressed piston ring 19, the band 22 will represent the contour of the outer wall of the piston ring. With the resilient band of accurate uniform thickness throughout, the outer wall of the band may be measured for imperfections of the outer wall of the piston ring, and these imperfections will show one way or the other at the indicator 7.

The resilient band 22 constitutes ring holding means in which the split ring may be held under cylinder compression, that is, held to cylinder form and under the same compression it would be held if placed in a cylinder. On account of this band being made accurately from thin resilient metal it cannot readily withstand rough handling and for this reason I have provided the holder 21 to facilitate mounting the band about the ring. It is easy to compress the split piston ring and place it in the bore of the holder 21, whereas it might not be so easy to place the split piston ring in the band without such a holder for the band.

The rollers and wheel of the apparatus constitute ring positioning means by which the band inclosed ring may be supported for rotation, and the indicator plunger constitutes a feeling instrumentality which will cause the indicator to show any imperfections of symmetry in the configuration of the piston ring. It is essential that the band be of uniform thickness and susceptible to distortion by the ring under compression, otherwise any high or low spots about the piston ring could not be detected by the indicator. In order that the ring may be measured it is essential that the band inclosing ring truly represent the periphery of the ring, and it is by virtue of this band that the piston ring may be driven from within while its outside contour is measured.

Briefly stated my method of testing the roundness of a split ring consists in holding the ring under cylinder compression by a resilient band which will conform to the shape of the ring, and then feeling the outer wall of the band to ascertain any imperfections of symmetry of the outer wall of the ring.

The above is suggestive of gripping the piston ring from its interior and adjusting it for cylinder compression, with the gripping means mounted for rotation so that the outer wall of the piston ring may be examined for roundness, but it is believed that such gripping and ring adjusting means would be somewhat more expensive and cumbersome compared to my simple apparatus. Nevertheless, I do not care to confine my invention to the specific form of apparatus disclosed and reserve the right to make such changes in my invention as are permissible by the appended claims.

What I claim is:—

1. A method of testing split piston rings for roundness, which method consists in making a continuous uninterrupted resilient band of uniform thickness with the inner diameter of the band corresponding to the diameter of a cylinder wall, holding the band at its outer wall so that said band cannot yield, placing a split ring under compression in the held band, then releasing the held band so that said band inclosed ring may be handled as a unit, and then rotating the band inclosed ring relative to an indicator engaging the outer wall of the band so that the indicator will show imperfections in the contour of the band corresponding to similar imperfections in the ring inclosed by the band.

2. A ring testing apparatus comprising a wall, rollers on said wall and on which rollers a ring may be supported against said wall, a wheel supported from said wall in opposing relation to said rollers and adapted to cooperate therewith in retaining said ring between said wheel and rollers so that said wheel may impart rotation to said ring relative to said wall, and a measuring instrumentality supported by said wall for engagement with said ring to ascertain imperfections of the periphery of said ring.

3. An apparatus for testing rings comprising a band of uniform thickness in which a ring may be placed under compression so that the band conforms to the outer wall of the ring, a support having a pair of rollers adapted to engage the outer wall of said band, a drive wheel on said support adapted to engage the inner wall of said ring at a point intermediate the engagement of said rollers and band, and a measuring instrumentality diametrically opposed to said drive wheel for engaging said band so that the periphery of said band may be measured to ascertain the imperfections of the ring mounted in the band.

In testimony whereof I affix my signature.

HARRY S. GRAVES.